Sept. 5, 1967 J. J. HERRERA 3,339,523

FILM STRIPING APPARATUS

Filed Oct. 15, 1962 2 Sheets-Sheet 1

INVENTOR.
JOSEPH J. HERRERA
BY Albert M. Herzig
ATTORNEYS.

Sept. 5, 1967 J. J. HERRERA 3,339,523

FILM STRIPING APPARATUS

Filed Oct. 15, 1962 2 Sheets-Sheet 2

INVENTOR.

JOSEPH J. HERRERA

BY Albert M. Herzig

ATTORNEYS.

United States Patent Office 3,339,523

Patented Sept. 5, 1967

3,339,523

FILM STRIPING APPARATUS

Joseph J. Herrera, 2301 W. Silver Lake Drive, Los Angeles, Calif. 90039

Filed Oct. 15, 1962, Ser. No. 230,594
6 Claims. (Cl. 118—12)

In general, the present invention relates to an apparatus adapted to stripe a length of tape without soiling or scratching the remainder of the tape surface. More particularly, the present invention relates to an apparatus for laying a thin stripe of uniform width and thickness of a liquid suspension on the surface of a length of film, such as the 8-millimeter and 16-millimeter film used for home movies. In the present application, the word "tape" includes such photographic film, the magnetic tape used for sound recording, and any other ribbon upon which it is desired to lay a thin stripe of liquid.

In recent years many methods and apparatus have been developed to coat the surface of tapes made of materials such as paper and cellulose acetate with a free-flowing liquid suspension of magnetic material. Various magnetic materials may be used for the coating, the one most commonly used at the present time being very finely divided magnetic oxide of iron. The dispersion of the magnetic material is made in a suitable liquid vehicle or carrier commonly containing a solvent such as tolulol, isopropyl acetate and so forth. The suspension, while free-flowing, has a viscosity conducive to the laying down of a coating on the tape base which remains substantially intact during the drying operation. The solvent is volatilized during the drying operation, leaving a solid but pliable residue of magnetic material on the tape base. In order to facilitate and to improve the adherence of the magnetic material to the tape, the surface of the tape to be coated with the magnetic material may be precoated with a suitable adhesive material, such as a copolymer of polybutadiene with acrylonitrile, the methyl esters of acrylic acid, and so forth. The magnetic material is then laid on the adhesive surface and subjected to drying.

Commonly, such coating operation is accomplished by passing the tape between a bottom support and the discharge opening of a feed hopper of the coating material so that the coating is applied to the whole surface of the tape as it moves thereunder. However, as noted in Speed Patent 2,700,367, such prior art methods and apparatus are subject to a number of difficulties. Thus the tape may have an occasional pimple or berry-like projection on its upper or under side or both; or a foreign particle may be deposited on and cling to the tape base. Such obstructions interfere with the passage of the tape base through the gap between the bottom support and feed hopper so that the tape may become torn or at lease the uniformity of the thickness of the coating is markedly affected. Consequently, elaborate and expensive apparatus and methods have been developed in an attempt to obtain the uniform thickness of the coating over the whole surface of the tape. An example of such apparatus is illustrated in Speed U.S. Patent 2,748,015.

In recent years, there has been increasing interest in home movies which include a sound track so that verbal comments or music may be made in conjunction with the various scenes of the movie. Such a sound track requires a thin stripe of magnetic material along the edge of the film being shown so that the pictures themselves are not interfered with. To lay such thin stripe of magnetic material, the prior art methods have not been found satisfactory, since they were specifically designed to coat the whole surface of the film with the magnetic material. Consequently, other methods and apparatus have been developed, such as illustrated in Blaney's U.S. Patent 2,657,932. However, such prior art methods and apparatus have continued to encounter such problems as dirt on the film so that a thin stripe of uniform width and thickness has been very difficult to achieve. To date, the apparatus for laying such thin stripe has been so complicated and expensive that such striping must be done in large commercial establishments at a relatively high cost to the film user. For example, there is normally a minimum charge up to a given number of feet to be striped with a sound track, such as fifty feet, so that the person who wishes to stripe merely five feet of his home movie with a sound track would find it extremely expensive to do so. In addition, the requirement that the contract for home movies be prepared in commercial establishments necessitates the trouble and time delay in having the film sent out to the establishment and returned to the film user.

Consequently, an object of the present invention is an apparatus for laying a stripe of magnetic material on photographic film, i.e. a sound track, which may be utilized in the home without special skill or training.

Another object of the present invention is an inexpensive, simple apparatus which may be used to lay a thin stripe of uniform thickness and width and which is also suited for commercial mass production striping at low cost without large capital investments.

Still another object of the present invention is a simple apparatus for laying a thin stripe of uniform width and thickness of a viscous liquid suspension on the surface of a length of tape without soiling or scratching the remainder of the tape.

Other objects and advantages of the present invention will be readily apparent from the following description and drawings which illustrate an exemplary embodiment of the present invention.

In general, the present invention involves a method and apparatus adapted to rapidly lay a uniformly thin stripe of constant thickness of a viscous liquid suspension on the surface of a length of tape without soiling or scratching the remainder of the tape surface. The invention includes a hopper for containing a liquid suspension adjacent the tape. The surface of the tape is contacted with the first portion of the rim of a rotatable wheel. Second portion of the rim of said wheel is immersed in the liquid suspension in the hopper. The wheel is rotated by a length of tape moved thereby in frictional contact therewith.

In order to facilitate understanding of the present invention, reference will now be made to the appended drawings of a preferred specific embodiment of the present invention. Such drawings should not be construed as limiting the invention which is properly set forth in the appended claims.

Figures 1, 2, 6, 7:
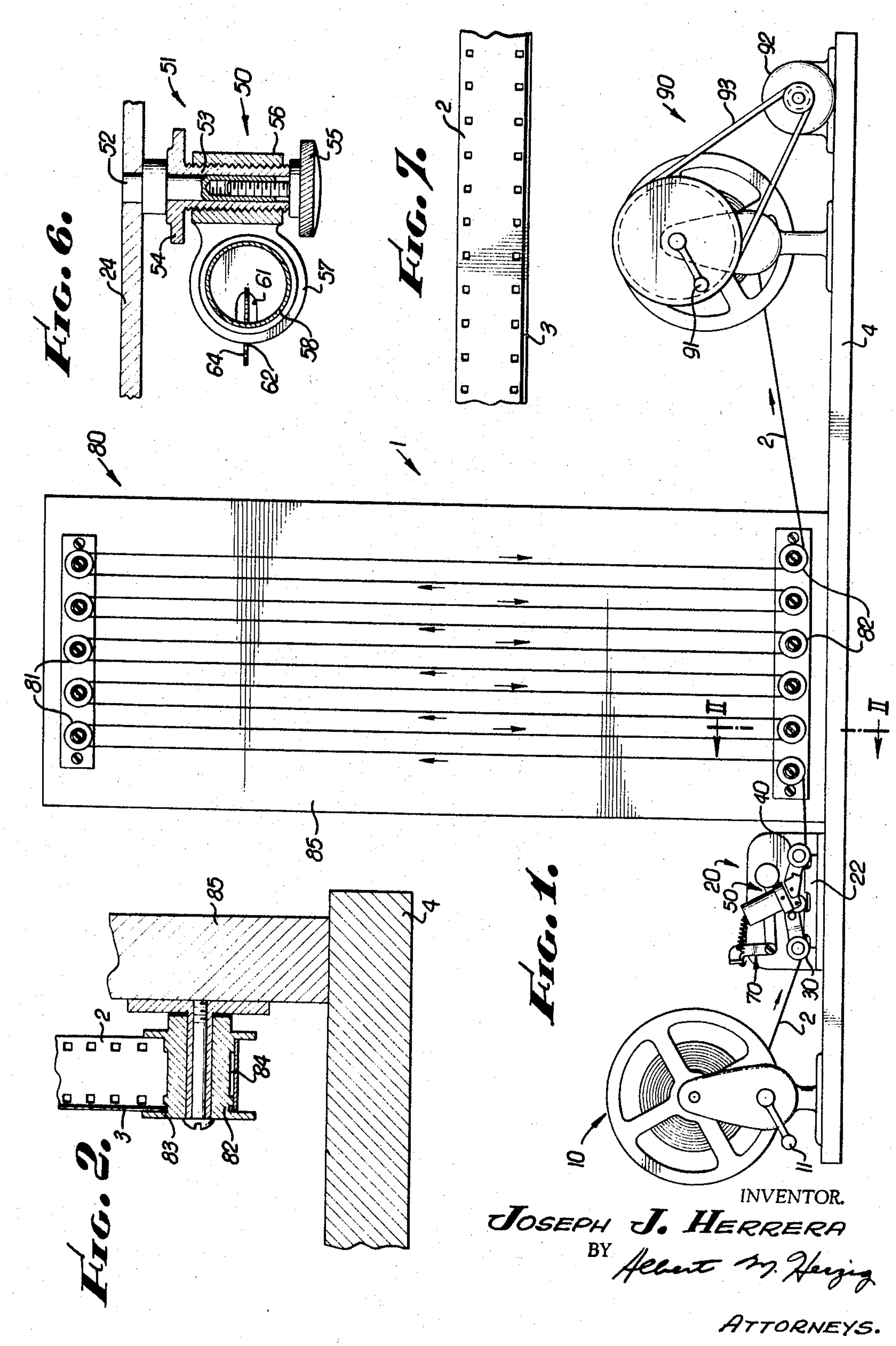
FIG. 1 is a front elevation of the complete apparatus of the present invention.
FIG. 2 is a cross-sectional view of FIG. 1 taken along the lines of II—II of FIG. 1.
FIG. 6 is a cross-sectional view of FIG. 3 taken along the lines VI—VI of FIG. 3.
FIG. 7 is an illustration of the striped film produced by the present invention.
Figure 3:
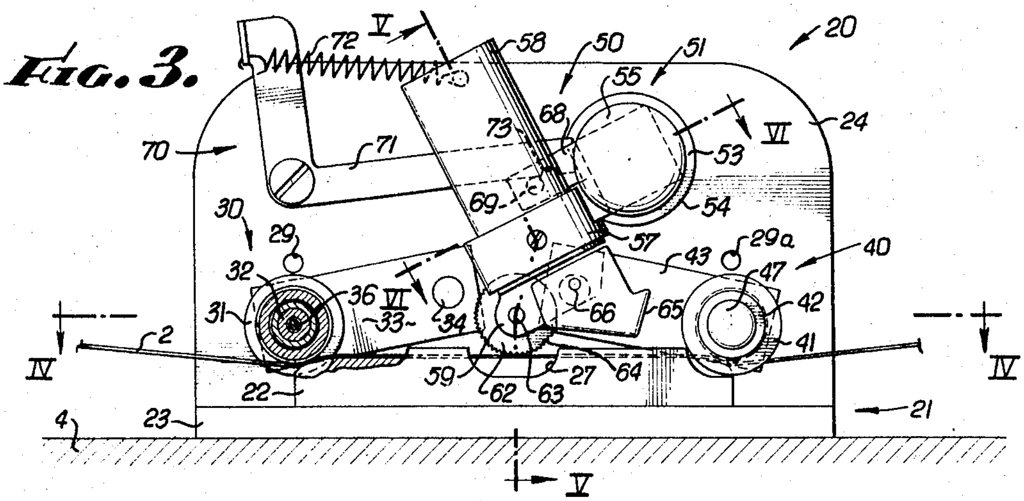
FIG. 3 is a side elevation of an enlarged portion of FIG. 1 showing the striping apparatus portion of the present invention with its various parts in their lower position.
Figure 4:
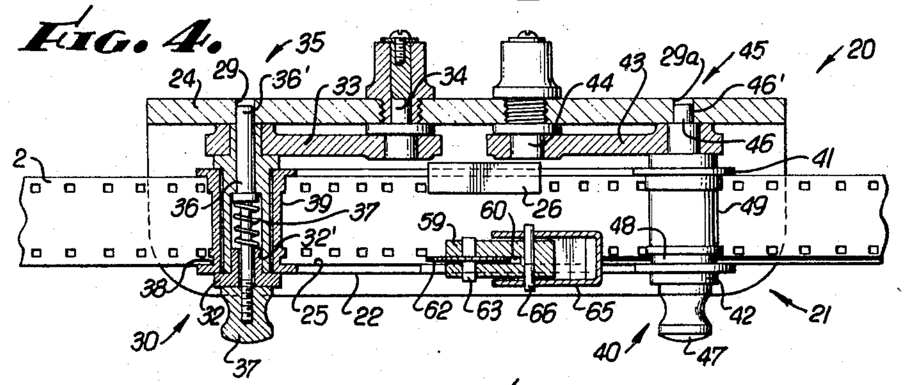
FIG. 4 is a cross-sectional view of FIG. 3 taken along the lines of IV—IV of FIG. 3.

As illustrated in FIG. 1, the apparatus 1 includes a first rotatable reel 10 for storing a length of tape 2 and continuously feeding tape 2 to a striping means 20. Striping means 20 is adapted to lay uniformly thin stripe 3 of constant thickness of a liquid suspension on the surface of tape 2 while tape 2 is moved through striping means 20. The drying means 80 receives the tape 2 from the striping means 20. The drying means 80 receives the tape 2 from the striping means 20 and moves the tape 2 over a large distance without contacting the stripe 3 of liquid suspension. Finally, a second rotatable reel 90 continuously receives the tape 2 and stores it. The reel 10, striping means 20, drying means 80, and reel 90 are mounted in series on a rigid bed 4 which is easily portable and can be conveniently stored in a small space in the home.

The first and second rotatable reels each have a handle 11 and 91, respectively, for rotating them naturally. In addition, the second reel 90 has a motor 92 connected by a belt 93 to drive the second reel mechanically. As illustrated in FIG. 2, the drying means 80 includes a plurality of drying rollers 81 and 82 mounted on an erect wall 85 over which the tape 2 passes in sequence to form a long travelling path. Each of said drying rollers 82 contacting the striped surface of tape 2 has a circumferential groove 83 therein adjacent the stripe 3 of liquid suspension so that the stripe 3 does not contact the surface of said drying rollers 82. The drying rollers 81 which do not contact the striped surface of tape 2 may also have the groove 83, if desired, so that they are interchangeable with the drying rollers 82. In addition, both sets of drying rollers 81 and 82 have a circumferential channel 84 in the center of the roller to prevent soiling and scratching of the central portion of the tape 2 when it is film containing the photographic images.

The striping means 20 of the present invention is illustrated in detail in FIGS. 3–8. As illustrated in FIGS. 3–8, the striping means 20 includes a track means 21 for slidably positioning the length of tape to move on a straight path through the striping apparatus 20. A first rotatable drum means 30 is mounted at the entrance and adjacent to the track means 21 for maintaining the length of tape 2 in track means 21. A second rotatable drum means 40 is mounted at the exit and adjacent to the track means 21 also for maintaining said length of tape 2 in track means 21. A frame means 50 is pivotally mounted adjacent the track means 21 between drum means 30 and 40, and it has mounted thereon a hopper 58, a rotatable wheel 62 and a catch pan 65. A spring-biased lever means 70 mounted adjacent the frame 50 holds the frame 50 so that the wheel 62 is removed from the surface of tape 2 and alternately maintains the frame 50 so that the wheel 62 is in substantial frictional contact with the surface of tape 2.

The track means 21 for slidably positioning the length of tape 2 to move on a straight path through the striping apparatus 20 has a platform 22 mounted on a base 23 which has a vertical back plate 24. Platform 22 of the track means 21 includes a longitudinal recess 25 in which the tape 2 is set for guidance on the straight path. Adjacent the wheel 62 when it is in contact with the surface of tape 2 is a flange 26 to aid in maintaining the tape 2 in the recess 25. Also an aperture 27 is formed in the side of the recess 25 adjacent the wheel 62 when it contacts tape 2 so that the point of contact may be observed from the side of the striping means 20 and any surplus of liquid suspension deposited at that point is removed through the sprocket holes in the tape or over the edge of the tape. Preferably, platform 22 includes a central channel 28 to protect the central portion of the tape 2 or film from soiling and scratching.

Figures 5, 8:
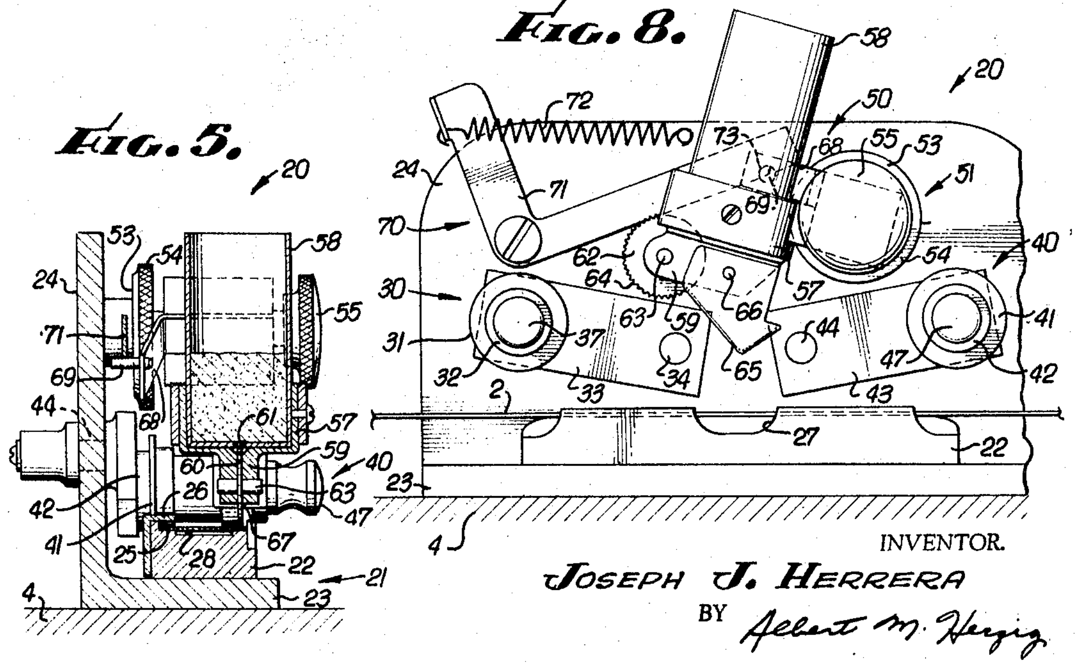
FIG. 5 is a cross-sectional view of FIG. 3 taken along the lines of V—V of FIG. 3.
FIG. 8 is a side elevation of the striping apparatus of the present invention similar to FIG. 3 with the various parts in their raised position.

The first rotatable drum means 30 is mounted at the entrance to the track means 21 while the second rotatable drum means 40 is mounted at the exit of said track means 21 so that the length of tape may be maintained in the track means 21 as it is being pulled through the striping means 20 onto the drying means 80. The first drum means 30 and the second drum means 40 each include a drum 31 and 41, respectively, rotatably mounted on axles 32 and 42, respectively. Similar to the drying rollers 81 and 82, the drums 31 and 41 include circumferential grooves 38 and 48, respectively, to prevent contacting the stripe 3 and make them interchangeable. Also, drums 31 and 41 include circumferential channels 39 and 49, respectively, to prevent contact with the central portion of the tape. The axles 32 and 42 are each fixed to arms 33 and 43, respectively, which are adapted to pivot on shafts 34 and 44, respectively, mounted on the back plate 24. The arms 33 and 43 are each adapted to pivot drums 31 and 41, respectively, from a position adjacent to the track means 21 (FIG. 3) to a position remote from track means 21 (FIG. 8). Each of the arms 33 and 43 have latch means 35 and 45, respectively, mounted thereon for releasably maintaining each of said positions. The latch means 35 and 45 include spring-biased shafts 36 and 46, respectively (note spring 37), which are slidably mounted in bores of axles 32 and 42, respectively (note bore 32'). Shafts 36 and 46 each have one end 36' and 46', respectively, adapted to be releasably inserted into holes 29 and **29*a*, respectively, in back plate 24 to maintain the positions shown in FIGS. 3 and 8, respectively. Shafts 36 and 46 are released from holes 29 and 29*a*, respectively, by gripping and pulling knobs 37 and 47**, respectively, attached thereto.

Frame means 50 is pivotally mounted adjacent track means 21 between the drum means 30 and 40 on a support means 51. Support means 51 includes a rod 52 mounted on the back plate 24 above and parallel to the surface of tape 2 in track means 21 and mounted perpendicularly to the path of tape 2 in track means 21. A sleeve 53 is rotatably mounted on rod 52 and pivotally supports frame means 50. Frame means 50 is adapted to be adjustably positioned along the length of sleeve 53 by the rotation of sleeve 53 by gripping the ridge 54 thereon. In this way the contact of the rim 64 of wheel 62 with the surface of the tape 2 may be varied over a portion of the width of tape 2. A brake pin 55 is adjustably mounted on rod 52 and adapted to releasably fix the position of sleeve 53 on rod 52.

The frame means 50 includes a cylinder 56 which is threaded on the sleeve 53 and has a cup 57 laterally extending therefrom. The cup 57 of frame means 50 has a hopper 58 mounted therein for containing the liquid suspension of magnetic material. Dependent from cup 57 is a ridge 59 having a slot 60 in its central portion. Adjoining slot 60 in the ridge 59 is a slit 61 in the walls of the hopper 58 and cup 57. A rotatable wheel 62 is mounted in the slots 60 and 61 by means of a pin 63 passing therethrough and mounted in the ridge 59. The wheel 62 has a rim 64 having a first portion adapted to be brought into and out of contact with the surface of tape 2 in track means 21 by the rotation of the frame means 50 on the support means 51. A second portion of the rim 64 of wheel 62 is in the hopper 58 in contact with the liquid suspension therein.

A catch pan 65 is also mounted on the frame means 50 by a pin 66 extending through the ridge 59. The catch pan 65 is adapted to receive the excess liquid suspension from the wheel 62 by having a slot 67 in its walls in which the wheel 62 is received and by being positioned adjacent to the point where the wheel 62 during its rotation enters the slit 61 in the hopper 58. Preferably, the rim 64 of the wheel 62 is serrated to promote retention of the liquid suspension thereon and deposition of said liquid suspension on the surface of the tape. Frame means 50 also has an arm 68 extending substantially parallel to the back plate 24. Arm 68 has a pin 69 projecting therefrom towards back plate 24 which is adapted to become engaged with the lever means 70.

Lever means 70 is mounted adjacent frame means 50 for holding frame means 50 so that the wheel 62 is removed from the surface of tape 2 and alternately for maintaining the frame means 50 so that the wheel 62 is in substantial frictional contact with the surface of tape 2. The lever means 70 includes a lever 71 biased by a spring 72 into contact with the pin 69 mounted on the frame means 50. The lever 71 has a notch 73 therein which is adapted to receive the pin 69 and hold the frame 50 so that the wheel 62 is removed from the surface of tape 2. When the pin 69 is released from the notch 73 by raising the lever 71, the pin 69 slides along the lower edge of the lever 71 while the lever 71 presses on the frame 50 so that the wheel 62 is in substantial frictional contact with the surface of the tape 2. While the spring 72 causes such substantial frictional contact between the wheel 62 and the tape 2, it permits the wheel 62 to ride on the surface of the tape 2 and thus ride over any more projections which may be under the surface of tape 2.

The operation of the apparatus illustrated in FIGS. 1–8 is very simple and adapted to be utilized by the amateur photographer in the home without special skill or training. Initially, the apparatus 1, particularly the striping means 20, is in the position illustrated in FIG. 8 with the drum means 30 and 40 in positions remote from the track means 21 and the wheel 62 removed from the surface 28 of the track means 21. The tape 2 may then be simply inserted into the striping means 20 by laying it on the upper surface of recess 25 in the platform 22 of the track means 21 with the flange 26 temporarily holding it in place. The drum means 30 and 40 may then be moved to their positions adjacent to the track means 21 so that the film 2 is slidably maintained therein. Tape 2 may then be threaded through the drying means 80 and onto the second rotatable reel means 90. Once the film 2 is threaded into position, the hopper 58 of the striping means 20 may be filled with the liquid suspension of magnetic material and the wheel 62 brought into contact with the tape 2 by releasing the pin 69 from the notch 73 of the lever 71. The frictional contact of the wheel 62 with the tape 2 caused by the force exerted by the spring 72 through the lever 71 onto the frame means 50 causes the wheel 62 to rotate when the tape 2 is passed thereunder. The rotation of the wheel 62 first through the hopper 58 in contact with the liquid suspension therein and then in contact with the tape 2 causes a thin stripe of liquid suspension to be deposited on the film having a uniform thickness and width. Most of the excess liquid suspension picked up by the wheel 62 in the hopper 58 is removed by the slit 61 of the hopper as the rim 64 of the wheel 62 rotates out of the hopper because of the small clearance involved. The remainder of the excess of liquid suspension is removed from the wheel 62 during its rotation at a point before it again enters the body of liquid suspension through the slit 61 and after it contacts the tape 2. Such portion of the excess is received in the catch pan 65 and thereby prevented from dropping onto the surface of the tape 2. After passing through the striping means 20, the film then passes through the drying means 80 to dry the stripe before it is wound onto the second reel means 90.

Many other specific embodiments of the present invention will be obvious to one skilled in the art in view of this disclosure. For example, if two or more stripes are desired to be laid upon the tape as it passes through the striping means, additional wheels may be simply added to the frame to produce this result. Similarly, the hopper and the wheel may be mounted below the surface of the tape to be striped by making suitable alterations in the structure of the apparatus. Also, the hopper may be threaded at its base so that it may be screwed in the cup and it may have a top cover to prevent excessive evaporation from the liquid suspension. Any convenient latch means may be utilized to position the drum means and such latch means may not be coaxial with the drum portion of the drum means. For example, the latch means may consist of merely holes in the arms 33 and 43 which may be aligned with corresponding holes in the back plate 24 and a pin thrust therethrough.

There are many features in the present invention which clearly show the significant advance the present invention represents over the prior art. Consequently, only a few of the more outstanding features will be pointed out to illustrate the unexpected and unusual results obtained by the present invention. One of the features of the present invention is a simple, inexpensive striping apparatus which may be utilized at home by the amateur photographer without special skill or training. Thus, if the amateur photographer desires to stripe a short length of film he need merely get his apparatus out, stripe the length of film and have the result accomplished within a few minutes at the cost of a fraction of a cent in comparison with the long delay and expensive process of getting the film striped commercially. Another feature of the present invention is the utilization of a wheel which first rotates through a hopper in contact with the liquid suspension and then deposits the liquid suspension on the surface of the tape. Thus a thin stripe of uniform width of thickness is obtained simply and directly. Preferably, such wheel is serrated to promote the retention of the liquid suspension on the rim and cause depressions in the surface of the film to promote deposition and retention of the liquid suspension by the film during its drying and after the stripe has dried.

Another feature of the present invention is the utilization of a wheel that is spring-biased into contact with the film being striped so that suitable frictional contact is obtained without the need of carefully regulating the tension exerted on the film by the remainder of the striping apparatus. Also, such arrangement permits the wheel to compensate for irregularities in the surface of the film by riding over them and thus avoid tearing the film or flooding of the surface of the film by the liquid suspension. Also, another feature of the present invention is the adjustment of the position of the wheel with respect to the width of the tape while permitting the wheel to remain freely rotatable.

It will be understood that the foregoing description and drawings are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:

1. An inexpensive, simple striping apparatus adapted to rapidly lay a uniformly thin stripe of constant thickness of a viscous liquid suspension on the surface of a length of tape without soiling or scratching the remainder of the tape surface, comprising:

(a) a track means for slidably positioning said length of tape to move on a straight path through said striping apparatus;

(b) a first rotatable drum means mounted at the entrance and adjacent to said track means for maintaining said length of tape in said track means;

(c) a second rotatable drum means mounted at the exit and adjacent to said track means for maintaining said length of tape in said track means;

(d) a frame means pivotally mounted adjacent said track means between said drum means, said frame means having:

(I) a hopper mounted thereon for containing said liquid suspension, (II) a rotatable wheel mounted thereon, said wheel having a first portion of its rim adapted to be brought into and out of frictional contact with the surface of the tape in said track by the rotation of said frame and having a second portion of its rim in said hopper in contact with the liquid suspension therein, said hopper having a slit in its walls adapted to slidably receive said wheel, and (III) a catch pan mounted thereon for receiving the excess liquid suspension from said wheel; and (e) a spring-biased lever means mounted adjacent said frame means for holding said frame means so that said wheel is removed from the surface of said tape and alternately for maintaining said frame means so that said wheel is in substantial frictional contact with the surface of said tape.

2. A striping apparatus as stated in claim 1 wherein said frame means is pivotally mounted on a support means, said support means including:

(a) a rod mounted above and parallel to the surface of the tape in said track means and mounted perpendicular to the path of the tape in said track means;

(b) a sleeve rotatably mounted on said rod and pivotally supporting said frame, said frame being adapted to be adjustably positioned along the length of said sleeve by the rotation of said sleeve whereby the contact of the rim of said wheel with the surface of said tape may be varied over a portion of the width of said tape; and (c) a brake pin adjustably mounted on said rod, said brake pin adapted to releasably fix the position of said sleeve on said rod.

3. A striping apparatus as stated in claim 1 wherein each of said drum means is rotatably mounted on a pivoted arm adapted to pivot said drum from a position adjacent to said track means to a position remote from said track means, each of said arms having a latch means mounted thereon for releasably maintaining each of said positions.

4. A striping apparatus as stated in claim 3 wherein said latch means comprises a spring-biased shaft slidably mounted on each of said arms perpendicular to the plane of rotation of said arms, said shaft being adapted to having one end being releasably inserted into holes in an adjacent stationary structure.

5. A striping apparatus as stated in claim 1 wherein said catch pan has a slot in its walls in which said wheel is received and is positioned adjacent to the point where said wheel during its rotation enters the slit in said hopper.

6. A striping apparatus as stated in claim 1 wherein said wheel has a serrated rim.

References Cited

UNITED STATES PATENTS

| | | | |
|---|---|---|---|
| 342,484 | 5/1886 | Wade | 15—571 |
| 1,945,086 | 1/1934 | Schmitt | 118—235 |
| 2,165,812 | 7/1939 | Pfleger | 15—571 |
| 2,494,160 | 1/1950 | Bihary | 118—252 |
| 2,633,431 | 3/1953 | De Sylva | 117—64 |
| 2,748,015 | 5/1956 | Speed et al. | 117—7 |
| 2,774,327 | 12/1956 | Saint-Hilaire | 118—33 |
| 2,915,038 | 12/1959 | Wallenberg | 118—258 |

ALFRED L. LEAVITT, *Primary Examiner.*

MURRAY KATZ, *Examiner.*

A. M. GRIMALDI, J. B. SPENCER, *Assistant Examiners.*